Patented Jan. 7, 1941

2,227,664

UNITED STATES PATENT OFFICE 2,227,664

CARBAZOLE DERIVATIVES

Walter Mieg, Opladen, and Willy Burneleit, Cologne-Deutz, Germany, assignors to General Aniline & Film Corporation, a corporation of Delaware No Drawing. Original application July 14, 1936, Serial No. 90,612. Divided and this application November 5, 1938, Serial No. 239,175. In Germany August 2, 1935

4 Claims. (Cl. 260—316)

The present invention relates to a new process of preparing carbazole derivatives and to new carbazole derivatives which are obtainable thereby.

It is known that anthrimides, i. e. secondary amines wherein the two substituents are of the anthraquinone series can be converted into carbazoles by the action of aluminium halogenides. However, this method of working cannot be applied generally to the preparation of carbazoles from arylaminoanthraquinones. Carbazoles of the said type can be prepared by causing agents which are capable of splitting off hydrogen halide to react upon α-arylido-anthraquinones which, in either the aryl or anthraquinone-nucleus, contain a halogen atom in o-position to the imino group. A process of this kind is described in the copending application Serial No. 31,725 filed July 31, 1935, by Walter Mieg. However, the said process is not capable of effecting carbazole-ringclosure of other arylaminoquinones f. i. of arylaminonaphthoquinones.

One object of our present invention is the development of a new process which can be applied generally to the preparation of carbazoles from secondary amines, wherein one substituent represents an aryl radical and the other represents a para-quinone of a ring-system having at least two condensed nuclei. Other objects of our invention will be apparent from the following description and claims.

We have found that carbazoles of the type specified in the preceding paragraph can be prepared by causing copper to react at an elevated temperature upon secondary amines of the character described wherein each of the said radicals contains a halogen atom in one ortho-position with respect to the imino group. The reaction is preferably performed in the presence of a high boiling solvent such as nitrobenzene, naphthalene, quinoline, diphenylether or benzophenone. The reaction temperature is preferably kept at about 200° C. to about 220°. We prefer to work in the presence of nitrobenzene as the boiling point thereof lies within the said range and serves to keep the reaction temperature within the optimal limits. Tertiary amines such as quinoline or pyridine may have an accelerating action on the reaction.

Suitable aryls are the phenyl-, naphthyl-, diphenylyl-, fluorenyl-, pyrene- or chrysene radicals. Residue of partially hydrogenated aryls such as of tetrahydronaphthalene or hexahydrodiphenyl are intended to fall within the term "aryl radicals." The term "para-quinone of a ring system having at least two condensed nuclei" includes in the first line naphthoquinones and anthraquinones though quinones of higher ring systems are not excluded from our invention. The starting materials may contain alkyl groups as substituents without departing from the scope of our invention. The starting materials may even contain further halogen atoms as those contained in ortho-position to the imino group are more reactive than other halogen atoms.

This application is a divisional application of our U. S. application Ser. No. 90,612, filed July 14, 1936, Patent 2,154,176.

The following examples illustrate the invention without, however, restricting it thereto, the parts being by weight:

Example 1

A solution of 7.5 parts of bromine in 15 parts of nitrobenzene is slowly added at room temperature to a mixture of 16 parts of 1-para-toluido-2-bromanthraquinone and 90 parts of nitrobenzene, whereby one atom of bromine is caused to enter the toluidine residue in the ortho-position to the imino group. Stirring is continued for some time and the red-brown precipitated crystals are sucked off.

10 parts of the 1-para-toluido-2.2'-dibromanthraquinone thus obtained are heated while stirring for nearly 30 minutes in a mixture of 70 parts of nitrobenzene and 20 parts of quinoline, with the addition of 5 parts of copper-powder. The mixture is refluxed until the originally red color of the solution has changed to brown-yellow. After cooling the precipitated orange-yellow crystals of the 6-methyl-1.2-phthaloylcarbazole are filtered off and freed from copper by obvious methods analogous to the method disclosed in "Berichte der Deutschen Chemischen Gesellschaft," vol. 49, 1916, page 741, lines 6 to 10.

Example 2

19.5 parts of 1-(1-bromo-2-naphthylamino)-2-bromo-anthraquinone, obtained by brominating 1-β-naphthylamino-2-bromo-anthraquinone are heated to boiling while stirring for one hour with 19 parts of copper-powder, 90 parts of nitrobenzene and 20 parts of pyridine. After cooling the resulting product is filtered with suction, freed from copper by obvious methods analogous to the method disclosed in "Berichte der Deutschen Chemischen Gesellschaft," vol. 49, 1916, page 741, lines 6 to 10 and recrystallized from nitrobenzene. The dyestuff represents brown needles.

We claim:

1. The process of preparing carbazoles which comprises reacting copper at an elevated temperature with an α-arylaminoanthraquinone selected from the group consisting of phenylaminoanthraquinone, naphthylaminoanthraquinone, diphenylylaminoanthraquinone, fluorenylaminoanthraquinone, pyreneaminoanthraquinone, chryseneaminoanthraquinone, the alkyl and halogen substitution products thereof and the corresponding compounds wherein the aryl radical is partially hydrogenated, said α-arylaminoanthraquinone having a halogen atom in one ortho-position wtih respect to the imino group in both the aryl and the anthraquinone radical, the copper being added in sufficient amount to react with and remove both of said ortho halogen atoms.

2. The process of preparing carbazoles which comprises reacting copper at an elevated temperature with an α-arylaminoanthraquinone selected from the group consisting of phenylaminoanthraquinone, naphthylaminoanthraquinone, diphenylylaminoanthraquinone, fluorenylaminoanthraquinone, pyreneaminoanthraquinone, chryseneaminoanthraquinone, the alkyl and halogen substitution products thereof and the corresponding compounds wherein the aryl radical is partially hydrogenated, said α-arylaminoanthraquinone having a halogen atom in one ortho-position with respect to the imino group in both the aryl and the anthraquinone radical, the copper being added in sufficient amount to react with and remove both of said ortho halogen atoms, the reaction being performed in the presence of an indifferent high boiling solvent.

3. The process of preparing carbazoles which comprises reacting copper at an elevated temperature with an α-arylaminoanthraquinone selected from the group consisting of phenylaminoanthraquinone, naphthylaminoanthraquinone, diphenylylaminoanthraquinone, fluorenylaminoanthraquinone, pyreneaminoanthraquinone, chryseneaminoanthraquinone, the alkyl and halogen substitution products thereof and the corresponding compounds wherein the aryl radical is partially hydrogenated, said β-arylaminoanthraquinone having a halogen atom in one ortho-position with respect to the imino group in both the aryl and the anthraquinone radical, the copper being added in sufficient amount to react with and remove both of said ortho halogen atoms, the reaction being performed in the presence of an indifferent high boiling solvent having a tertiary amine dissolved therein.

4. The process of preparing carbazoles which comprises reacting copper at a temperature between about 200° C. and about 220° C. with an α-arylaminoanthraquinone selected from the group consisting of phenylaminoanthraquinone, naphthylaminoanthraquinone, diphenylylaminoanthraquinone, fluorenylaminoanthraquinone, pyreneaminoanthraquinone, chryseneaminoanthraquinone, the alkyl and halogen substitution products thereof and the corresponding compounds wherein the aryl radical is partially hydrogenated, said α-arylaminoanthraquinone having a halogen atom in one ortho-position with respect to the amino group in both the aryl and the anthraquinone radical, the copper being added in sufficient amount to react with and remove both of said ortho halogen atoms.

WALTER MIEG.
WILLY BURNELEIT.